United States Patent [19]

Doi et al.

[11] Patent Number: 5,584,240
[45] Date of Patent: Dec. 17, 1996

[54] EMBOSSING APPARATUS FOR INORGANIC BOARD AND METHOD OF EMBOSSING THEREBY

[75] Inventors: Yoshitaka Doi, Tajimi; Masaki Kanai, Kuwana, both of Japan

[73] Assignee: Nichiha Corporation, Nagoya, Japan

[21] Appl. No.: 506,180

[22] Filed: Jul. 25, 1995

[30] Foreign Application Priority Data

Jun. 28, 1995 [JP] Japan .................. 7-186452

[51] Int. Cl.$^6$ .................. B31F 1/07
[52] U.S. Cl. .................. 101/32; 101/4
[58] Field of Search .................. 101/32, 4, 3.1, 101/28

[56] References Cited

U.S. PATENT DOCUMENTS

| | | | |
|---|---|---|---|
| 1,114,620 | 10/1914 | McLaurin | 101/3.1 |
| 2,134,754 | 11/1938 | Flint et al. | 101/3.1 |
| 2,702,411 | 2/1955 | Winstead | 101/32 |
| 4,624,181 | 11/1986 | Anderson | 101/4 |
| 5,031,525 | 7/1991 | Kent et al. | 101/32 |
| 5,479,853 | 1/1996 | Carroll et al. | 101/32 |

OTHER PUBLICATIONS

Kramer, "Replication of Dffraction Gratings by Embossing Techniques", Xerox Disclosure Journal, vol. 7 No. 6. Dec. 1982.

*Primary Examiner*—Edgar S. Burr
*Assistant Examiner*—Anthony H. Nguyen
*Attorney, Agent, or Firm*—Donald S. Dowden

[57] ABSTRACT

An embossing apparatus for inorganic board and the method of embossing thereby are provided in the present invention. In the present invention, an uncured mat of inorganic board set on a lower fixed plate is embossed by a flexible mold plate of a upper movable plate wherein the surface of said flexible mold plate divided into a plural number of square patterns enclosed by ridges and said flexible mold plate is bent downward and convexly such that the ridge lines of said ridges on both sides of the lowest part of said flexible mold plate are respectively situated at the same level as the lowest part or higher than the lowest part.

4 Claims, 7 Drawing Sheets

EMBOSSING APPARATUS FOR INORGANIC BOARD AND METHOD OF EMBOSSING THEREBY

FIELD OF THE INVENTION

The present invention relates to an embossing apparatus for inorganic board and a method of embossing thereby. More particularly, the present invention relates to an embossing apparatus which forms square patterns on the surface of inorganic board consisting of a lower fixed plate, an upper movable plate, and a flexible mold plate, both ends of which are supported by the underside of said upper movable plate, wherein the surface of said flexible mold plate is divided into a plural number of squares by ridges forming joint grooves on the surface of inorganic board and said flexible mold plate is bent downward and convexly by its own weight or a press means and the ridge lines of ridges on both sides of the lowest part of said flexible mold plate are respectively situated at the same level as the lowest part of said flexible mold plate or at a higher level than the lowest part of said flexible mold plate.

Further the present invention relates to a method of embossing by using said embossing apparatus comprising setting an uncured mat of inorganic board on said lower fixed plate, and dropping said upper movable plate to press said mat between said flexible mold plate of said upper movable plate and said lower fixed plate to form square patterns on the surface of said mat, wherein the lowest part of said flexible mold plate first contacts the surface of said mat and then said flexible mold plate is gradually pressed on the surface of said mat exhausting the air between said mat and said flexible mold plate to form square patterns on the surface of said mat.

BACKGROUND OF THE INVENTION

Recently siding boards embossed to give a preferable design are diffused in the housing market. Especially siding boards having appearance in which square blocks having natural stone like surface are combined intermediating joint grooves have advantageously been used.

The material of said siding board is mainly inorganic board such as wood-cement board and the like and to manufacture embossed siding board using inorganic board as material, dry or semi-dry method or wet method is applied. In said dry or semi-dry method, a mixture consisting substantially of an inorganic curable material such as a cement and the like, and reinforcing wood material such as wood flake, wood wool, wood fiber, wood pulp and the like is strewed on the mold plate to form a dry mat and said dry mat is pressed with said mold plate to transfer the pattern of said mold plate to the surface of said dry mat and then said embossed dry mat is cured. On the other hand, in said wet method, said mixture consisting substantially of an inorganic curable material and a reinforcing wood material is dispersed in the water to prepare slurry and a dehydrated wet mat is formed on a net or felt by using said slurry by paper making method and then said dehydrated wet mat is pressed by a mold plate to transfer the patterns of said mold plate to the surface of said dehydrated wet mat and then said embossed wet mat is cured.

Said dry or semi-dry method has a disadvantage in that a large number of the mold plates should be prepared in the embossing process, which makes production inefficiency since the formed dry mats are pressed respectively with mold plates, while said dry or semi-dry method has an advantage in that deep embossing is easy for said dry mat since said dry mat has a coarse structure. On the other hand, said wet method has a disadvantage in that deep embossing is difficult for said wet mat since said wet mat has a close structure while said wet method has an advantage in that only one mold plate may be prepared for each line, which makes production efficient since the formed wet mat is successively pressed by a mold plate in the embossing process.

Wet-dry method in which a dry mat is formed on a wet mat by strewing the mixture of an inorganic curable material and a reinforcing wood material on a wet mat formed by paper making method to pick up advantages of both dry and semi-dry method and wet method (Japanese Patent Application No. Hei-6-292052).

DESCRIPTION OF THE PRIOR ART

Figure 11:
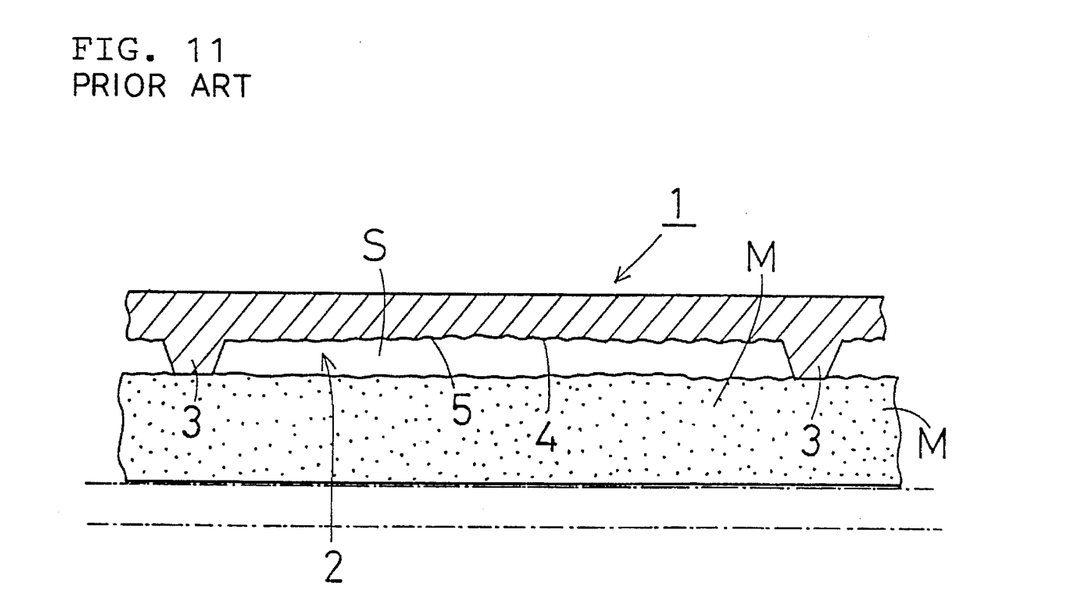
FIG. 11 shows the traditional embossing process.

Hitherto, to give the wet mat or the dry mat on the wet mat an appearance in which square blocks or tiles having natural stone like surface are combined intermediating joint grooves, a mold panel (1) is pressed on the surface of said mat M as shown in FIG. 11. In the surface (2) of said mold panel (1), ridges (3) to form said joint grooves are formed to divide the surface (2) of said mold panel (1) into a plural number of squares and the surface of said square mold parts (4) have respectively embossed patterns (5) to give said blocks or tiles a natural stone like embossed surface.

In said traditional embossing method, the air is trapped in the space S between said mat M and the surface (2) of said mold panel (1) enclosed by said ridges (3) and when said air blows up from said space S, said air may break embossed pattern on the surface of said mat M, causing a problem, that is, the embossed patterns (5) of said mold panel are not transferred clearly to the surface of said mat M.

SUMMARY OF THE INVENTION

An object of the present invention is to solve the above described problem and to transfer clearly the embossed pattern of the mold panel to the surface of the mat.

To attain this object, the present invention provide an embossing apparatus which forms square patterns on the surface of inorganic board consisting of a lower fixed plate, an upper movable plate, and a flexible mold plate, both ends of which are supported by the underside of said upper movable plate, wherein the surface of said flexible mold plate is divided into a plural number of squares by ridges forming joint grooves on the surface of inorganic board and said flexible mold plate is bent downward and convexly by its own weight or a press means and the ridge lines of ridges on both sides of the lowest part of said flexible mold plate are situated at the same level as the lowest part of said flexible mold plate or at a higher level than the lowest part of said flexible mold plate and further the present invention provides a method of embossing by using said embossing apparatus comprising setting an uncured mat of inorganic board on said lower fixed plate, and dropping said upper movable plate to press said mat between said flexible mold plate of said upper movable plate and said lower fixed plate to form square patterns on the surface of said mat, wherein the lowest part of said flexible mold plate first contacts the surface of said mat and then said flexible mold plate is gradually pressed on the surface of said mat exhausting the air between said mat and said flexible mold plate to form square patterns on the surface of said mat.

When said upper movable plate is dropped, the lowest part of said flexible mold plate first contacts the surface of said mat. In this situation, the ridge line of said ridges on both sides of the lowest part of said flexible mold plate just contact the surface of said mat or keep a space from the surface of said mat. Accordingly, the air between said mat and said flexible mold plate is exhausted smoothly without being trapped since said ridges on both side of the lowest part of said flexible mold panel respectively not encroach into the surface of said mat. Thus the embossing is carried out by pressing said flexible mold plate to the surface of said mat exhausting the air smoothly between said mat and said flexible mold plate.

BRIEF DESCRIPTION OF DRAWINGS

FIG. 1 to FIG. 10 show an embodiment of the present invention.

DETAILED DESCRIPTION OF THE INVENTION

Figure 1:
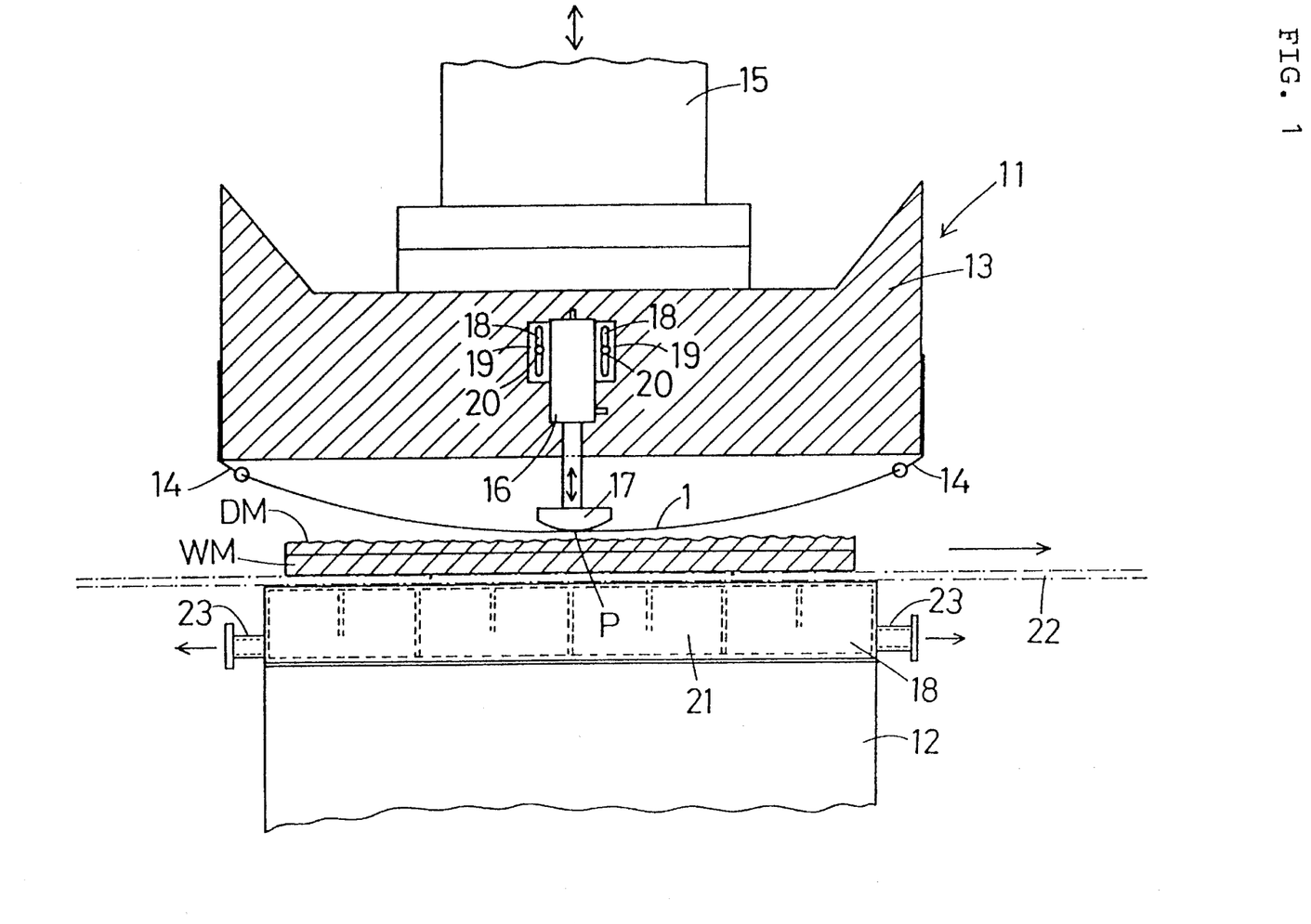
FIG. 1 is a side sectional view of an embossing apparatus.
Figure 2:
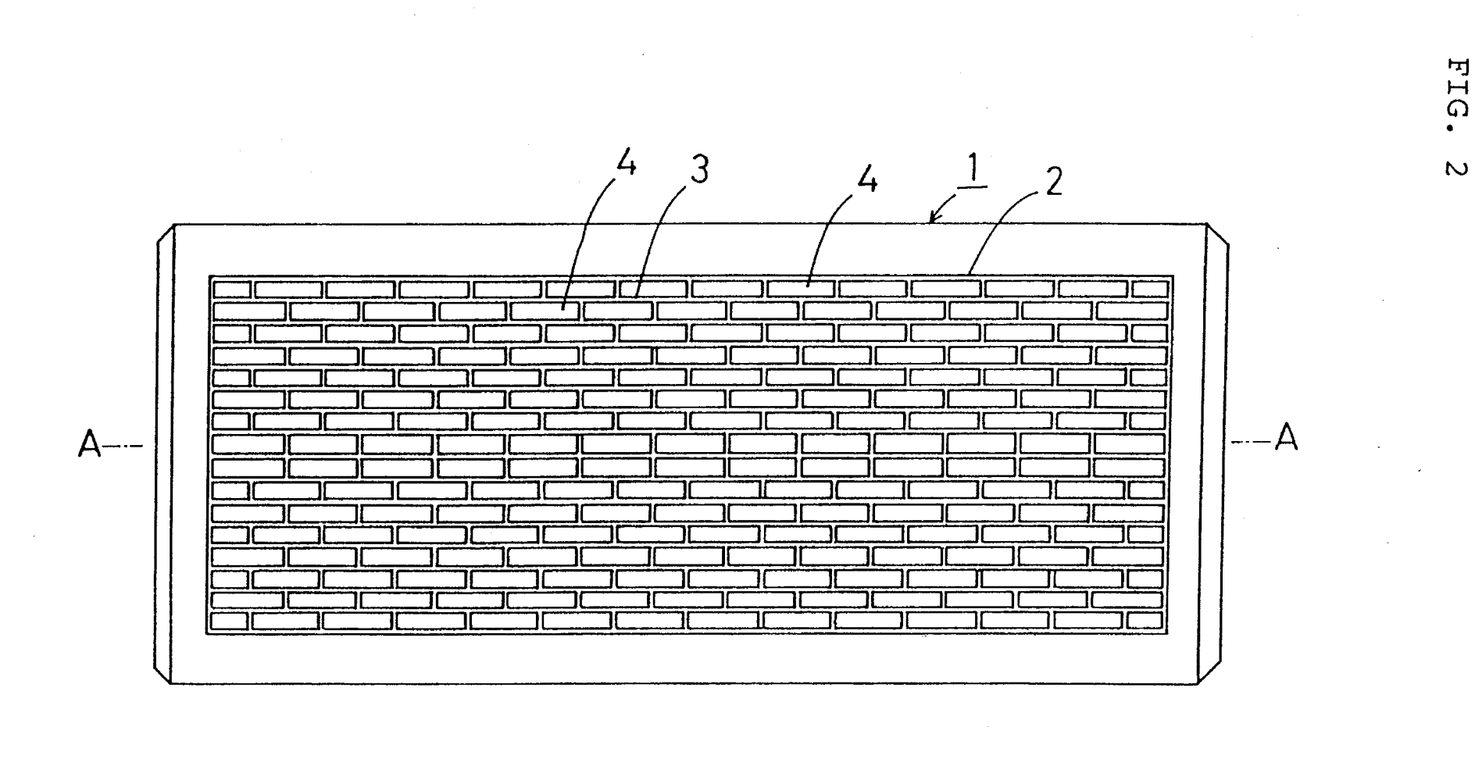
FIG. 2 is a plane view of a flexible mold plate.
Figure 3:
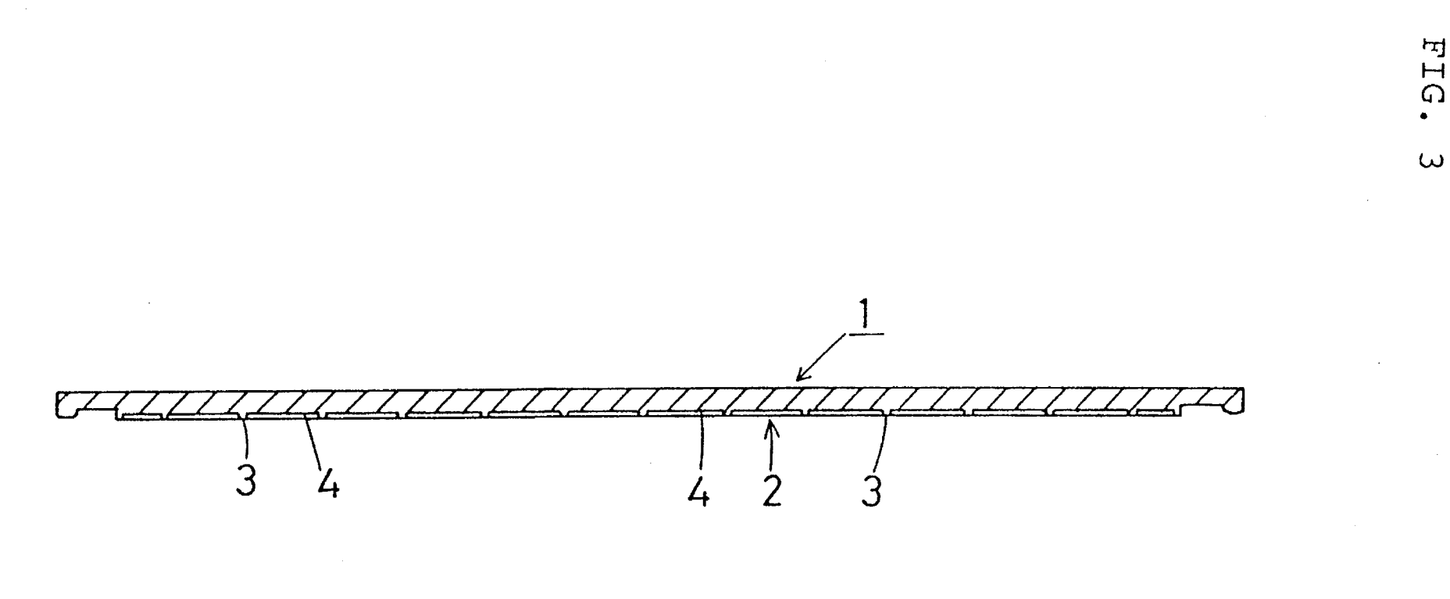
FIG. 3 is a side view of said flexible mold plate.
Figure 4:
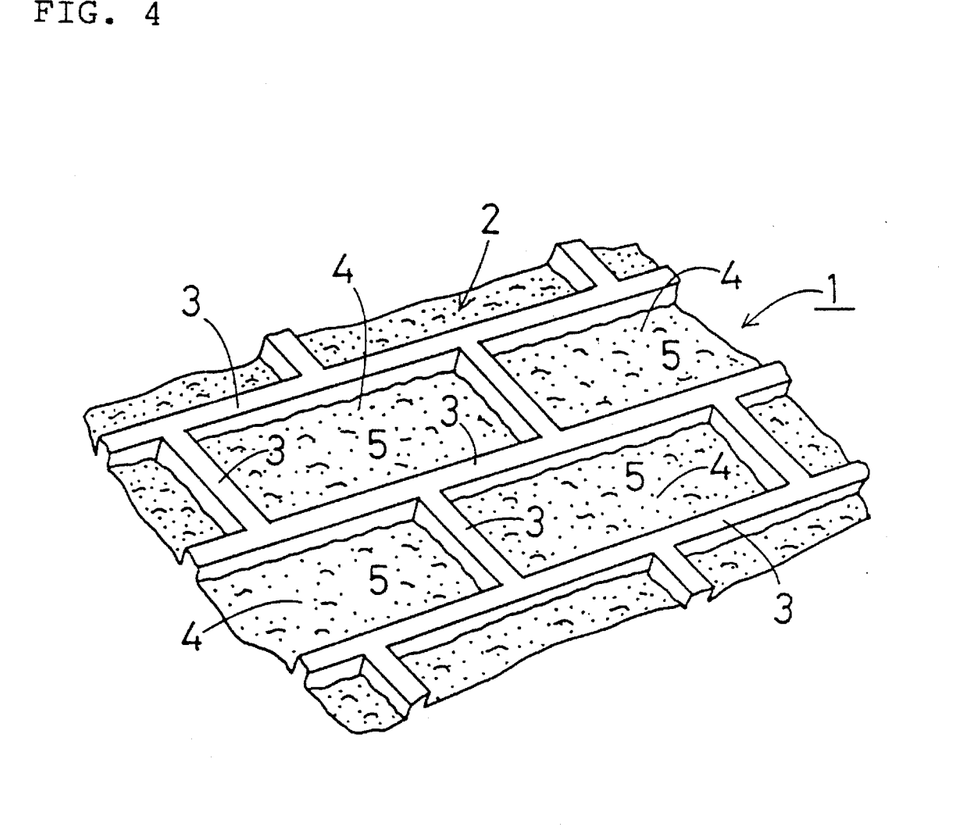
FIG. 4 is a partial perspective view of the surface of said flexible mold plate.

FIG. 1 to FIG. 10 show an embodiment of the present invention. Referring now to Figures, an embossing apparatus (11) consisting of a lower fixed plate (12), an upper movable plate (13) and a flexible mold plate (1), both ends of which are respectively supported by suspenders (14) attached to the underside of said upper movable plate (13). Said upper movable plate (13) is supported movably downward and upward by a press ram cylinder (15) and said flexible mold plate (1) is made of a flexible material having a high strength such as fiber reinforced plastic, engineering plastic, metal and the like. As shown in FIG. 2 to FIG. 4, the surface (2) of said mold panel (1) is divided into ridges (3) to form joint grooves on the surface of the resulting inorganic board into a plural number of squares (more broadly, rectangles, as illustrated in the drawings) and each square mold part (4) has embossed surface to give the resulting inorganic board a natural stone like embossed surface. In said upper movable plate (13), an air cylinder (16) is inserted and the press plate (17) of said air cylinder (16) presses the center of said flexible mold plate (1) to bend downward and convexly at a fixed radius of curvature. A pair of blackets (19) having vertical grooves (18) respectively is attached to the both sides of said air cylinder (16) and said blackets (19) are respectively attached to said upper movable plate (13) by bolts (20) penetrating in said vertical grooves (18) of said blackets (19) such that the vertical position of said air cylinder (16) can be adjusted. Accordingly, the radius of curvature of said bent flexible mold plate (1) is adjusted by the position of the press plate (17) of said air cylinder (16) and the vertical position of said air cylinder (16). Further a suction box (21) is put on said lower fixed plate (12) and said suction box (21) is connected to a vacuum pump not shown in figures by connecting pipes (23,23).

Figure 5:
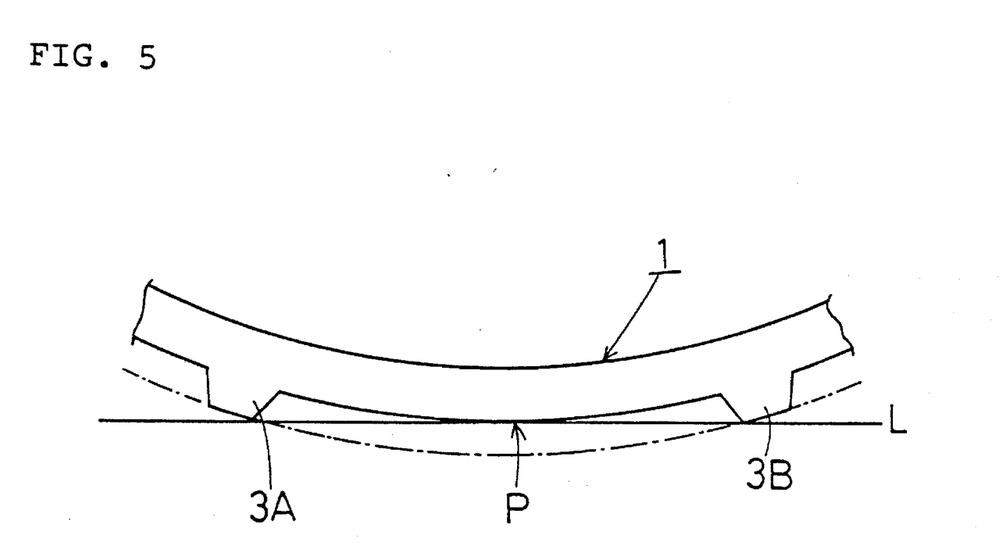
FIG. 5 is a partial side view of said flexible mold plate which is bent convexly.

As shown in FIG. 5, the radius of curvature of said flexible mold plate (1) is settled such that the ridge lines of ridges (3A,3B) on both sides of the lowest part P of said flexible mold plate (1) are respectively situated at the same level as the lowest part P or at a higher level than the lowest part P.

Figure 6:
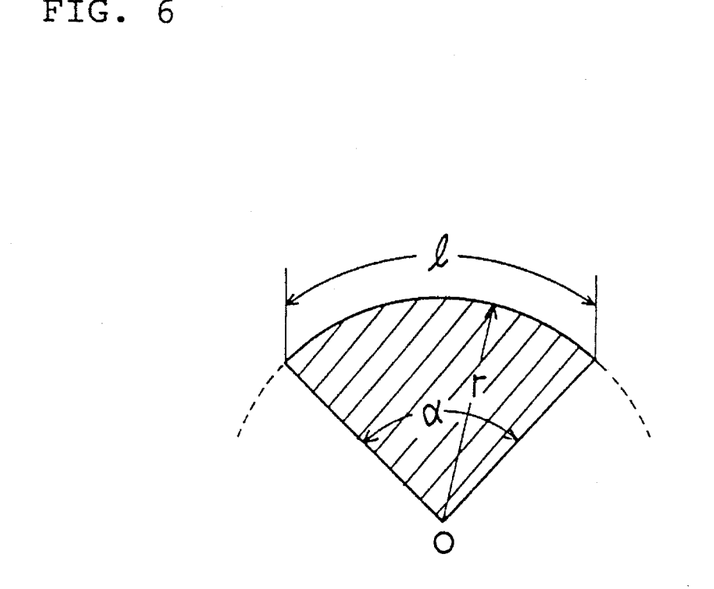
FIG. 6 is an illustration how to design said flexible mold plate (partial circle).

Referring now to FIG. 6, supposing that the radius of curvature is r, the distance between ridges (3A, 3B) is l, and the area of a fan shape enclosed by a pair of lines connecting center O to ridges (3A,3B) having a vertical angle $\alpha$ is A, $$l = \frac{r \times \alpha \times 3.1416}{180} = 0.01745\alpha r = \frac{2A}{r}$$

wherein $$A = \frac{1}{2} rl = 0.008727\alpha r^2$$

$$\alpha = \frac{57.296}{r}$$

$$r = \frac{2A}{l} = \frac{57.296}{\alpha}$$

Figure 7:
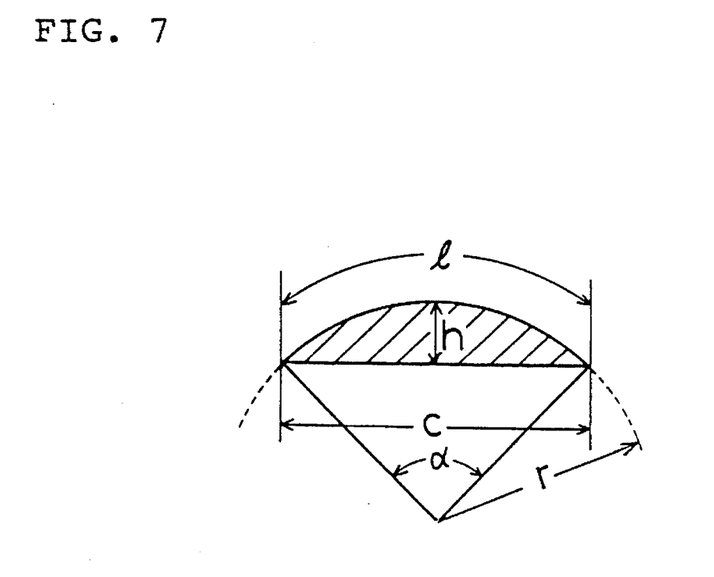
FIG. 7 is an illustration how to design said flexible mold plate (waned circle).

Referring now to FIG. 7, as the height of ridges (3A,3B) are respectively settled so as to be equal to h or lower than h, assuming the length of circular arc l is nearly equal to the linear distance C between ridges (3A,3B), $$c = 2\sqrt{h(2r-h)}$$

$$A = \frac{1}{2} [rl - c(r-h)]$$

$$r = \frac{c^2 + 4h^2}{8h}$$

$$l = 0.01745\alpha r$$

Accordingly, $$h = r - \frac{1}{2} \sqrt{4r^2 - c^2}$$

$$\alpha = \frac{57.296 l}{r}$$

By using above described formula, the relations of the distance between ridges l≈c, the height of ridges h (depth of joint grooves), the radius of curvature r and the vertical angle $\alpha$ are calculated as shown in Table 1.

In the embossing process, an uncured mat M on a porous conveyer belt (22) is conveyed on said suction box (21) on said lower fixed plate (12) of said embossing apparatus (11). As above described, said mat M consists of a wet mat WM of a mixture formed on said porous conveyer belt by the paper making method and a dry mat DM formed by strewing a mixture

TABLE 1

| Height of ridge (Depth of joint grooves) m/m | 5 m/m | | 4 m/m | | 3 m/m | |
| --- | --- | --- | --- | --- | --- | --- |
| | Radius of curvature r m/m | Angle ∝° | Radius of curvature r m/m | Angle ∝° | Radius of curvature r m/m | Angle ∝° |
| 1 ≈ c  300 m/m | 2252 | 7.63 | 2814 | 6.10 | 3751 | 4.58 |
| 250 m/m | 1565 | 9.15 | 1955 | 7.33 | 2606 | 5.50 |
| 200 m/m | 1003 | 11.42 | 1252 | 9.15 | 1668 | 6.87 |
| 150 m/m | 565 | 15.21 | 705 | 12.19 | 939 | 9.15 |
| 100 m/m | 253 | 22.65 | 315 | 18.19 | 418 | 13.71 | on said wet mat WM. For instance, said mixture may substantially consist of a cement and a reinforcing wood material such as wood flake, wood wool, wood fiber, wood pulp and the like, a reinforcing organic fiber such as polyester fiber, polyamide fiber, acryl fiber, acetate fiber and the like, and a reinforcing inorganic fiber such as glass fiber, carbon fiber, ceramic fiber, asbestos and the like.

When said mat M is set in said embossing apparatus (11), a vacuum pump is operated to evacuate said suction box (18) and said upper movable plate (13) is dropped by operating said press ram cyliner (15). When said upper movable plate (13) is dropped as above described, first the lowest part P of said flexible mold plate (1) bent downward and convexly contacts the surface of said mat M and in this situation, ridge lines of said ridges (3A,3B) on both sides of the lowest part P just contact the surface of said mat M or keep a space from the surface of said mat M.

Figure 8:
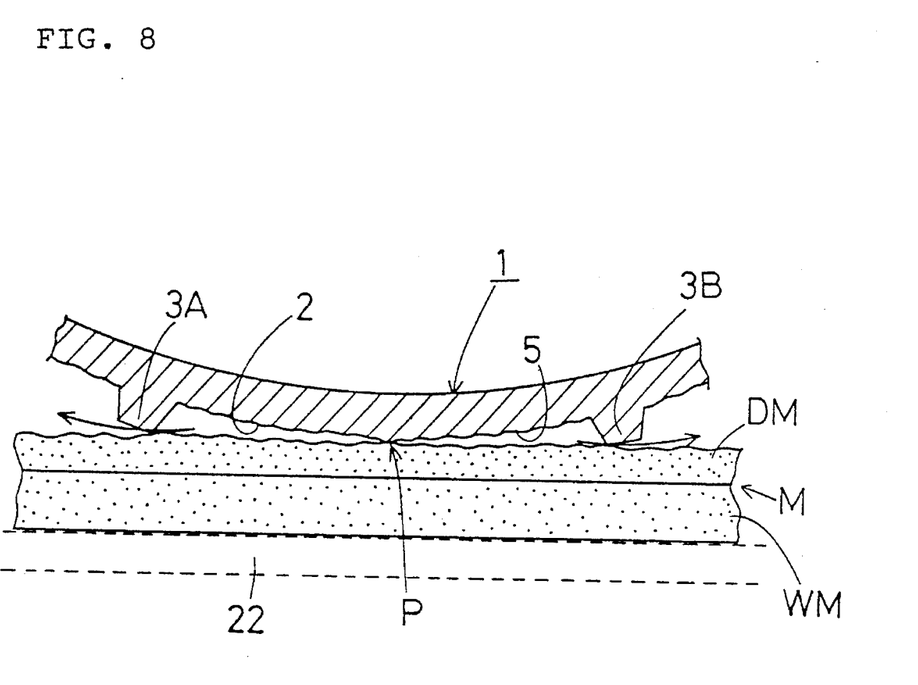
FIG. 8 is an illustration of the beginning of the embossing process.
Figure 9:
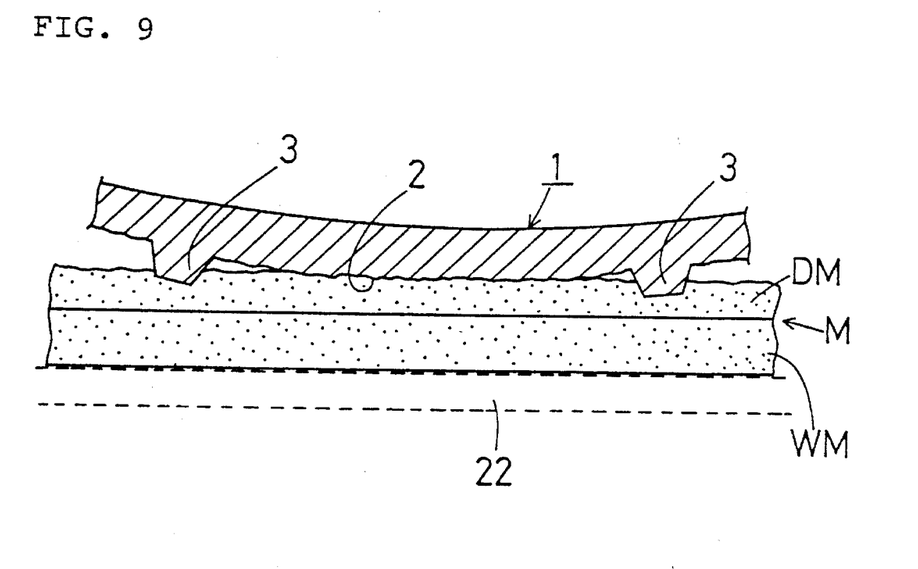
FIG. 9 is an illustration of the embossing process.

Accordingly, when said upper movable plate (13) is further dropped to press said flexible mold plate (1) to the surface of said mat M, the air between said mat M and said flexible mold plate (1) is smoothly exhausted as shown by an arrow in FIG. 8 without being trapped in the space enclosed ridges (3A,3B) on both sides of the lowest part P of said flexible mold plate (1).

Accordingly, the embossed patterns (5) of said flexible mold plate (1) are clearly transferred to the surface of said mat M without the embossed patterns transferred to the surface of said mat M being broken by the air. When said upper movable plate (13) is dropped to press said flexible mold plate (1) to the surface of said mat M, the position of the press plate (17) of said air cylinder (16) is gradually withdrawn to increase the radius of curvature of said flexible mold plate (1). Since said dry mat DM is formed on said wet real WM, even if the surface (2) of said flexible mold plate (1) has deep embossed patterns (5) said deep embossed patterns (5) are clearly transferred to the surface of said mat M.

When said flexible mold plate (1) is pressed to the surface of said mat M, the water is pressed out from the wet mat WM of said mat M and said water is sucked into said suction box (21).

As above described, the surface of said mat M is embossed and after then, said upper movable plate (13) is risen by said press ram cylinder (15) to release said flexible mold plate (1) from the surface of said mat M. When said flexible mold plate (1) is released from the surface of said mat M, both ends of said flexible mold plate (1) are respectively held up by said suspenders (14) attached to the underside of said upper movable plate (13) to be bending said flexible mold plate (1) convexly such that said flexible mold plate (1) can be smoothly released from the surface of said mat M.

Figure 10:
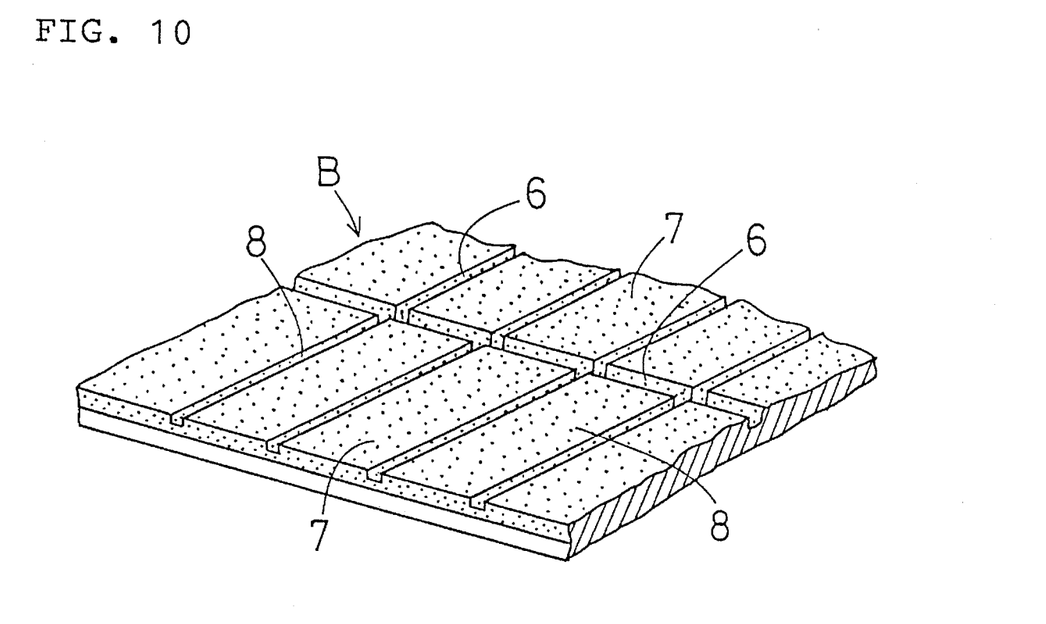
FIG. 10 is a partial perspective view of the resulting inorganic board.

After embossing, said mat M is cured at the room temperature or by heating and an inorganic board product B shown in FIG. 10 is manufactured. Square blocks or tiles (7) enclosed by joint grooves (6) are formed on the surface of said inorganic board product B by said embossing and the surface of each square blocks or tiles (7) has natural stone like patterns (8).

In the present invention, said flexible mold plate (1) may be bent by its own weight instead of being pressed by air cylinder. Further in the present invention, said mat may consists of only wet mat or dry mat.

We claim:

1. An embossing apparatus which forms rectangular patterns on the surface of inorganic board, said apparatus comprising a lower fixed plate an upper movable plate having an underside, and a flexible mold plate having a surface formed with ridges defining a plurality of rectangles, both ends of said flexible mold plate being supported by the underside of said upper movable plate, wherein said ridges form joint grooves on the surface of said inorganic board, said flexible mold plate is bent downward and convexly to define a lowest part of said flexible mold plate, the ridges lie on both sides of the lowest part of said flexible mold plate, and the ridges on both sides of the lowest part of said flexible mold plate are respectively situated at the same level as the lowest part of said flexible mold plate or at a higher level than the lowest part of said flexible mold plate.

2. Apparatus comprising a lower fixed mold plate, an upper movable mold plate, a flexible mold plate between said upper movable and said lower fixed mold plates and arcuately depending from the ends of said upper movable mold plate and means for moving said upper movable plate and said flexible mold plate downwardly toward said lower fixed mold plate, the arcuately depending flexible mold plate having a lowest part which initially contacts material on said lower mold plate to be molded, other parts of said flexible mold plate progressively coming into molding contact with said material on said lower fixed mold plate and being situated at the same level as the lowest part of said flexible mold plate or at a higher level than the lowest part of said flexible mold plate.

3. A method of embossing comprising setting an uncured mat of inorganic board on a lower fixed plate, providing an upper movable plate having a flexible mold plate attached thereto, dropping said upper movable plate to press said mat between said flexible mold plate and said lower fixed plate to form rectangular patterns on the surface of said mat, wherein said flexible mold plate has a lowest part which first contacts the surface of said mat and then said flexible mold plate is gradually pressed on the surface of said mat exhausting the air between said mat and said flexible mold plate to form rectangular patterns on the surface of said mat.

4. A method of embossing in accordance with claim 3 wherein said mat comprises a mixture of cement and a reinforcing wood material.

\* \* \* \* \*